US011026038B2

(12) United States Patent
Filos et al.

(10) Patent No.: US 11,026,038 B2
(45) Date of Patent: Jun. 1, 2021

(54) METHOD AND APPARATUS FOR AUDIO SIGNAL EQUALIZATION

(71) Applicant: QUALCOMM Incorporated, San Diego, CA (US)

(72) Inventors: Jason Filos, San Diego, CA (US); Graham Bradley Davis, Del Mar, CA (US); Ricardo De Jesus Bernal Castillo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/567,461

(22) Filed: Sep. 11, 2019

(65) Prior Publication Data
US 2020/0314578 A1    Oct. 1, 2020

(30) Foreign Application Priority Data

Apr. 1, 2019    (GR) .............................. 20190100153

(51) Int. Cl.
| H04S 7/00 | (2006.01) |
| H04R 1/40 | (2006.01) |
| H04R 3/00 | (2006.01) |
| H04R 3/04 | (2006.01) |
| H04R 5/02 | (2006.01) |
| H04R 5/04 | (2006.01) |
| H04S 3/00 | (2006.01) |
| G10L 15/22 | (2006.01) |

(52) U.S. Cl.
CPC .............. *H04S 7/301* (2013.01); *G10L 15/22* (2013.01); *H04R 1/406* (2013.01); *H04R 3/005* (2013.01); *H04R 3/04* (2013.01); *H04R 5/02* (2013.01); *H04R 5/04* (2013.01); *H04S 3/008* (2013.01); *G10L 2015/223* (2013.01); *H04S 2400/01* (2013.01); *H04S 2400/15* (2013.01)

(58) Field of Classification Search
CPC ...... H04S 7/301; H04S 3/008; H04S 2400/01; H04S 2400/15; G10L 15/22; H04R 1/406; H04R 3/005; H04R 3/04; H04R 5/02; H04R 5/04
USPC ......................................................... 381/303
See application file for complete search history.

(56) References Cited

U.S. PATENT DOCUMENTS

2020/0107121 A1*    4/2020    Choisel ................... H04S 7/301

* cited by examiner

*Primary Examiner* — Vivian C Chin
*Assistant Examiner* — Douglas J Suthers
(74) *Attorney, Agent, or Firm* — Moore Intellectual Property Law, PLLC (57) ABSTRACT

A device to perform audio signal equalization includes one or more processors configured to receive impulse response data corresponding to multiple audio channels. Each audio channel is associated with a corresponding microphone of multiple microphones of an audio device and indicative of sound propagation from one or more speakers of the audio device to the corresponding microphone. The one or more processors are configured to generate equalization filter data that is based on the impulse response data and that is indicative of multiple equalization filters. Each of the equalization filters is associated with a corresponding audio channel of the multiple audio channels. The one or more processors are also configured to process the equalization filter data to determine a playback equalization filter to be applied to an audio playback signal prior to playout at the one or more speakers.

30 Claims, 9 Drawing Sheets

METHOD AND APPARATUS FOR AUDIO SIGNAL EQUALIZATION

I. CROSS-REFERENCE TO RELATED APPLICATIONS

The present application claims priority from Greece Provisional Patent Application No. 20190100153, filed Apr. 1, 2019, entitled "METHOD AND APPARATUS FOR AUDIO SIGNAL EQUALIZATION," which is incorporated by reference in its entirety.

II. FIELD

The present disclosure is generally related to audio playback devices.

III. DESCRIPTION OF RELATED ART

When designing a sound bar or a "smart speaker" device (e.g., a wireless speaker and voice command device with an integrated assistant application), it is common to perform electro-acoustic compensation (or equalization) offline, during the design phase of the product, often using an anechoic room. However, such a pre-compensation does not account for non-linearities introduced by the acoustic environment when the device is used by an end-user. For example, non-linearities may be introduced by characteristics of a room in which the device is operated, such as the shape or geometry of the room, materials used in the room, reverberation characteristics, etc.

Equalization for the room response conventionally consists of a cumbersome manual calibration procedure in which the user is asked to wear a headset with a co-located microphone and a set of noise/tone signals are played out from the smart speaker or sound bar. Such manual calibration procedures often take a long time to complete, and often can require the user to sit stationary for several minutes, and sometimes up to 30 minutes, while the smart speaker or sound bar emits sounds that are generally perceived as annoying to the user.

IV. SUMMARY

According to one implementation of the present disclosure, a device to perform audio signal equalization includes a memory configured to store instructions. The device also includes one or more processors configured to execute the instructions to receive impulse response data corresponding to multiple audio channels. Each audio channel is associated with a corresponding microphone of multiple microphones of an audio device and indicative of sound propagation from one or more speakers of the audio device to the corresponding microphone. The one or more processors are configured to execute the instructions to generate equalization filter data that is based on the impulse response data and that is indicative of multiple equalization filters. Each of the equalization filters is associated with a corresponding audio channel of the multiple audio channels. The one or more processors are also configured to process the equalization filter data to determine a playback equalization filter to be applied to an audio playback signal prior to playout at the one or more speakers.

According to another implementation of the present disclosure, a method of audio signal equalization includes receiving, at one or more processors of a device, impulse response data corresponding to multiple audio channels. Each audio channel is associated with a corresponding microphone of multiple microphones of the device and indicative of sound propagation from one or more speakers of the device to the corresponding microphone. The method includes generating equalization filter data that is based on the impulse response data and that is indicative of multiple equalization filters. Each of the equalization filters is associated with a corresponding audio channel of the multiple audio channels. The method also includes processing the equalization filter data to determine a playback equalization filter to be applied to an audio playback signal prior to playout at the one or more speakers.

According to another implementation of the present disclosure, an apparatus includes means for receiving impulse response data corresponding to multiple audio channels and for generating equalization filter data that is based on the impulse response data and that is indicative of multiple equalization filters. Each audio channel is associated with a corresponding microphone of multiple microphones of a device and indicative of sound propagation from one or more speakers of the device to the corresponding microphone. Each of the equalization filters is associated with a corresponding audio channel of the multiple audio channels. The apparatus includes means for processing the equalization filter data to determine a playback equalization filter to be applied to an audio playback signal prior to playout at the one or more speakers.

According to another implementation of the present disclosure, a non-transitory computer-readable medium includes instructions that, when executed by one or more processors of a device, cause the one or more processors to perform operations for audio signal equalization. The operations include receiving, at the one or more processors, impulse response data corresponding to multiple audio channels. Each audio channel is associated with a corresponding microphone of multiple microphones of the device and indicative of sound propagation from one or more speakers of the device to the corresponding microphone. The operations include generating equalization filter data that is based on the impulse response data and that is indicative of multiple equalization filters. Each of the equalization filters is associated with a corresponding audio channel of the multiple audio channels. The operations also include processing the equalization filter data to determine a playback equalization filter to be applied to an audio playback signal prior to playout at the one or more speakers.

VI. DETAILED DESCRIPTION

Devices and methods to perform automatic room equalization are described. Automatic room equalization is performed using one or more speakers and multiple microphones of a device and does not require participation of the user. A room impulse response can be generated for each of the device's microphones based on capture of sound emitted from the device's speaker or set of speakers. The emitted sound can be "normal" sound, such as music or other audio content, instead of predetermined test signals as used in conventional manual room calibration procedures. Each microphone's audio input can be compared to the audio output to generate an impulse response for the audio channel associated with that microphone, and the impulse responses are used to generate equalization filter data corresponding to each audio channel. The equalization filter data is processed to generate an equalization filter for use during playback at the device.

The automatic room equalization described herein enables at least partial compensation of non-linearities introduced by the acoustic environment in addition to electro-acoustic deficiencies of the device itself. For example, the device may exhibit variability in individual component performance, such as a frequency response constraint of a speaker driver, an amplifier, or one or more other components of the device. The automatic room equalization can be performed when a change of the room environment is detected, such as when the device is moved or when a room impulse response is determined to have changed, such as due to a change in the furniture, wall coverings, floor surface, or other modification to the acoustic environment. The device can calibrate itself no matter where in the room it is placed and can reduce or eliminate problematic acoustic effects, such as coupling to corners of the room or coupling to certain enclosures or furniture.

The principles described herein may be applied, for example, to a speaker bar, a smart speaker, another audio device, or a component of a device that is configured to perform room equalization. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from another component, block or device), and/or retrieving (e.g., from a memory register or an array of storage elements).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled". For example, a loudspeaker may be acoustically coupled to a nearly wall via an intervening medium (e.g., air) that enables propagation of waves (e.g., sound) from the loudspeaker to the wall (or vice-versa).

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include speaker bars, smart speakers, cellular phones, personal digital assistants (PDAs), handheld devices, headsets, wireless modems, laptop computers, personal computers, etc.

Figure 1:
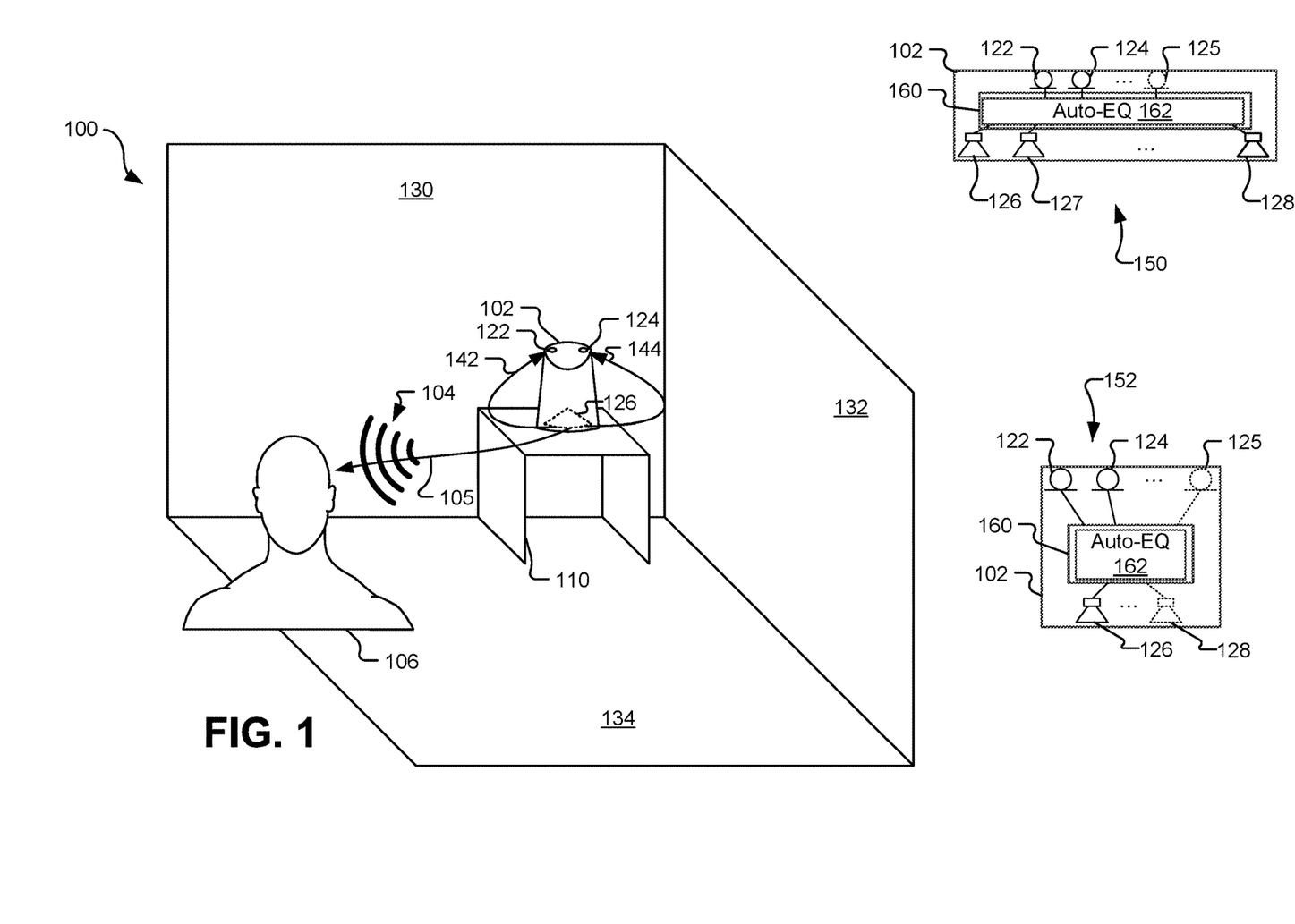
FIG. 1 is a diagram of a particular illustrative implementation of a system including a device operable to perform audio signal equalization.

FIG. 1 depicts a system 100 that includes a device 102 that is configured to provide sound 104 to a user 106 in a room. The device 102 (also referred to as an audio device 102) is configured to perform automatic calibration to reduce or eliminate sound distortion due to the geometry, materials, and furniture in the room and also due to non-ideal operation of electronic components in the device 102.

The device 102 includes multiple microphones, illustrated as a first microphone 122 and a second microphone 124, and one or more speakers, illustrated as a speaker 126. Although the device 102 is illustrated as including two microphones 122, 124, in other implementations the device 102 includes more than two microphones, such as three, seven, sixteen, or any other number of microphones. Although a single speaker 126 is illustrated as internal to the device 102 (e.g., at least partially enclosed within a housing of the device 102), in other implementations the device 102 includes two or more speakers.

The device 102 is illustrated positioned on a table 110 located near a first wall 130, a second wall 132, and a floor 134. The speaker 126 is configured to generate an output sound that is received by the user 106 as the sound 104. The output sound played out by the speaker 126 may also be received by the first microphone 122 and the second microphone 124 via a first acoustic path 142 and second acoustic path 144, respectively.

Although the acoustic paths 142, 144 are illustrated as curved arrows for ease of illustration, it should be understood that the first acoustic path 142, the second acoustic path 144, or both, may include a combination or superposition of multiple paths via which sound from the speaker 126 arrives at the respective microphone 122, 124, such as via one or more reflections off of an upper surface of the table 110, the first wall 130, the second wall 132, the ceiling, one or more other walls or pieces of furniture, or any combination thereof. As a result, each of the acoustic paths 142, 144 is associated with distortion which may include attenuation, amplification (e.g., in the case of acoustic resonance), delay, echoes, other distortion, or any combination thereof.

In addition, an acoustic path 105 between the device 102 and the user 106 represents a propagation of sound played out by the speaker 126 and received at the user 106 as the received sound 104. The received sound 104 may differ from the sound played out of the speaker 126 due to one or more distortion effects similar to the distortion effects described for the acoustic paths 142, 144.

Figure 3:
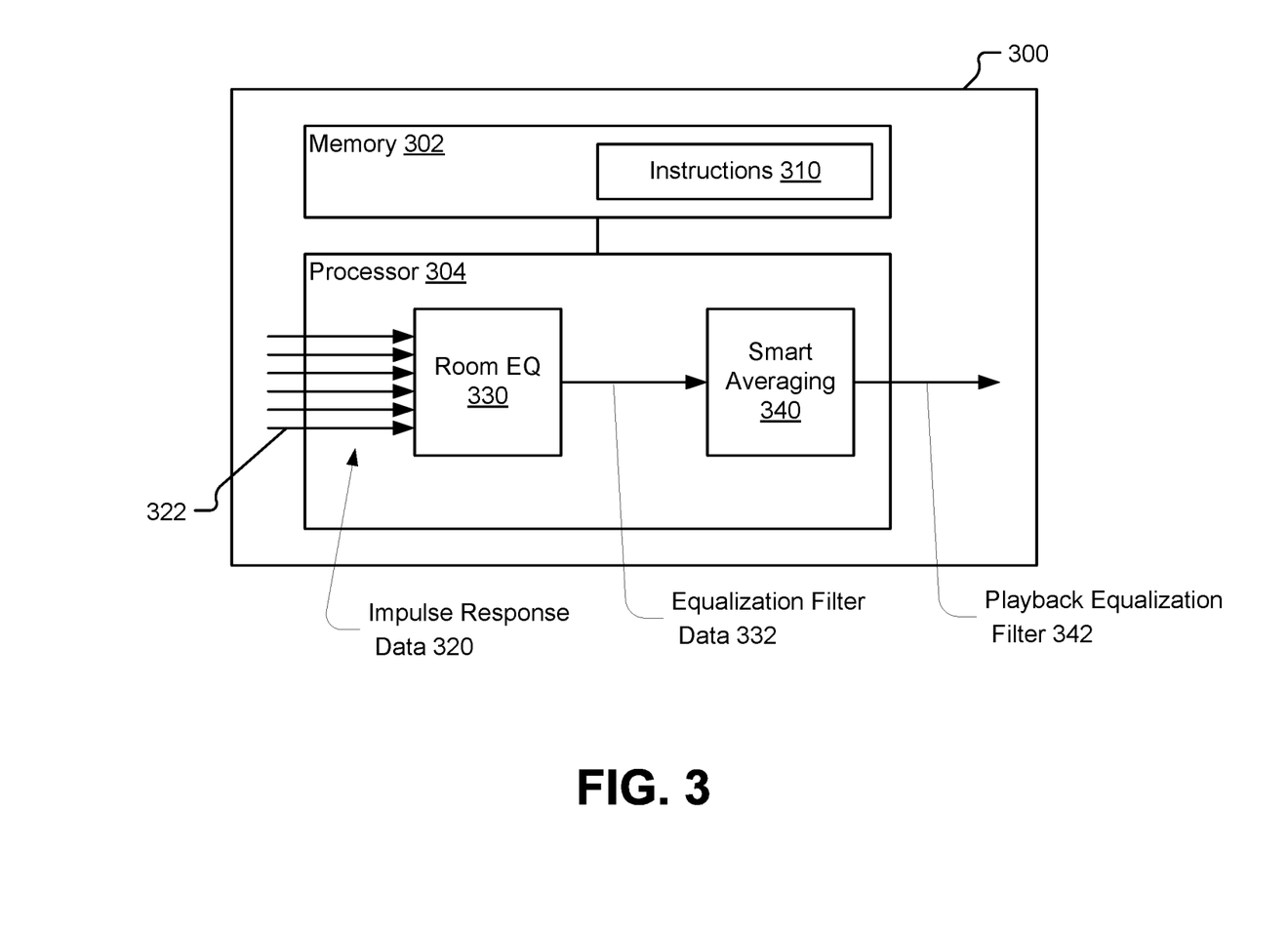
FIG. 3 is a diagram of another particular implementation of components that may be incorporated in the device included in the system of FIG. 1.

In some implementations, the device 102 includes one of a speaker bar or a wireless speaker and voice command device with an integrated assistant application (e.g., a smart speaker). For example, in a sound bar configuration 150, the device 102 includes the first microphone 122, the second microphone 124, and may include one or more additional microphones, up to an N-th microphone 125. (In this example, N is any integer greater than two.) Each of the microphones 122-125 is configured to provide a respective audio input signal to an electronic component 160. The electronic component 160 includes an auto-equalizer 162 that is configured to perform an automatic calibration and room equalization operation. For example, the auto-equalizer 162 may be implemented via software (e.g., instructions executable at a processor, such as depicted in FIG. 3). Alternatively, at least a portion of the functionality associated with auto-equalizer 162 may be performed via dedicated hardware, circuitry, or other physical components in place of, or in conjunction with, execution of instructions at a processor. The sound bar configuration 150 also includes multiple speakers, including the speaker 126, a second speaker 127, and may include one or more additional speakers including an M-th speaker 128, where M is any integer greater than two.

As another example, in a smart speaker configuration 152, the device 102 includes the first microphone 122, the second microphone 124, and may include one or more other microphones including the N-th microphone 125 coupled to the electronic component 160 that includes the auto-equalizer 162. In addition, in the smart speaker configuration 152 the device 102 includes the speaker 126 and may include one or more speakers, such as the M-th speaker 128.

As described in further detail with reference to FIGS. 2-7, the auto-equalizer 162 may include one or more processors that are configured to receive impulse response data corresponding to multiple audio channels, where each audio channel is associated with a corresponding microphone 122, 124 and is indicative of sound propagation from one or more speakers of the audio device 102 to the corresponding microphone, such as via the audio paths 142, 144. The processors may also be configured to generate equalization filter data that is based on the impulse response data and that is indicative of multiple equalization filters, where each of the equalization filters is associated with a corresponding audio channel of the multiple audio channels, and to process the equalization filter data to determine a playback equalization filter to be applied to an audio playback signal prior to playout at the one or more speakers.

In some implementations, an automatic calibration procedure is performed as the device 102 plays out a priori unknown music or movie content. The device 102 has access to the raw audio content via loopback, as described further with reference to FIG. 2. The content is unknown prior to playback but is supervised during playback for use in determining room equalization.

The internal microphones 122, 124 pick up the received signal that includes the direct-path propagation from loudspeaker/driver(s) 126 to the microphones 122, 124 and that also includes the tainted reflective-path propagation due to reflections from walls and furniture. In some implementations, the device 102 performs system identification using a normalized least mean squares adaptive filter (e.g., single-channel or multi-channel, and single-band or multi-band) from which room impulse responses (RIRs) are determined once the filters have converged (e.g., after a few seconds). An example of system identification is described in further detail with reference to FIG. 4.

In some implementations, the room impulse responses are used to automatically obtain equalization filter(s) using a weighted least squares (WLS) approach in which an "ideal" Dirac delta is used as the desired response. Further regularization and weighting are performed to mitigate sharp peaks that may otherwise appear in the resulting compensation filter (also referred to as a playback equalization filter), such as described further with reference to FIG. 4.

In some implementations, the speaker output audio signal is convolved with the compensation filter to obtain a corrected (e.g., at least partially equalized) response that mitigates adverse acoustic effects and causes the device 102 to sound substantially the same from anywhere in the room.

By using the auto-equalizer 162 to calibrate the audio playback based on the output sound that is received at the microphones 122, 124, the device 102 can at least partially compensate for distortion due to room geometry, materials, and furniture and also distortion due to non-ideal performance (e.g., temperature-related variations) of components in the device 102 without requiring the manual calibration or user input that is used for calibration of conventional systems. Actual music or movie audio content can be used for calibration during normal use by the user 106 without having to play out test tones or noise signals, resulting in an improved user experience. In addition, the auto-equalizer 162 can update calibration of the device 102 periodically over time and while the device 102 is in use, or when a change in the room is detected (e.g., when a change in a room impulse response(s) is detected), so that the device 102 can maintain calibration even when the location of the device 102 or its environment is changed. In some implementations, further enhancement can be achieved by processing user voice commands received at the device 102 to estimate the channel between user 106 and the device 102, enabling improved sound quality specifically at the user location (e.g., a sweet spot), as described further with reference to FIG. 7.

Figure 2:
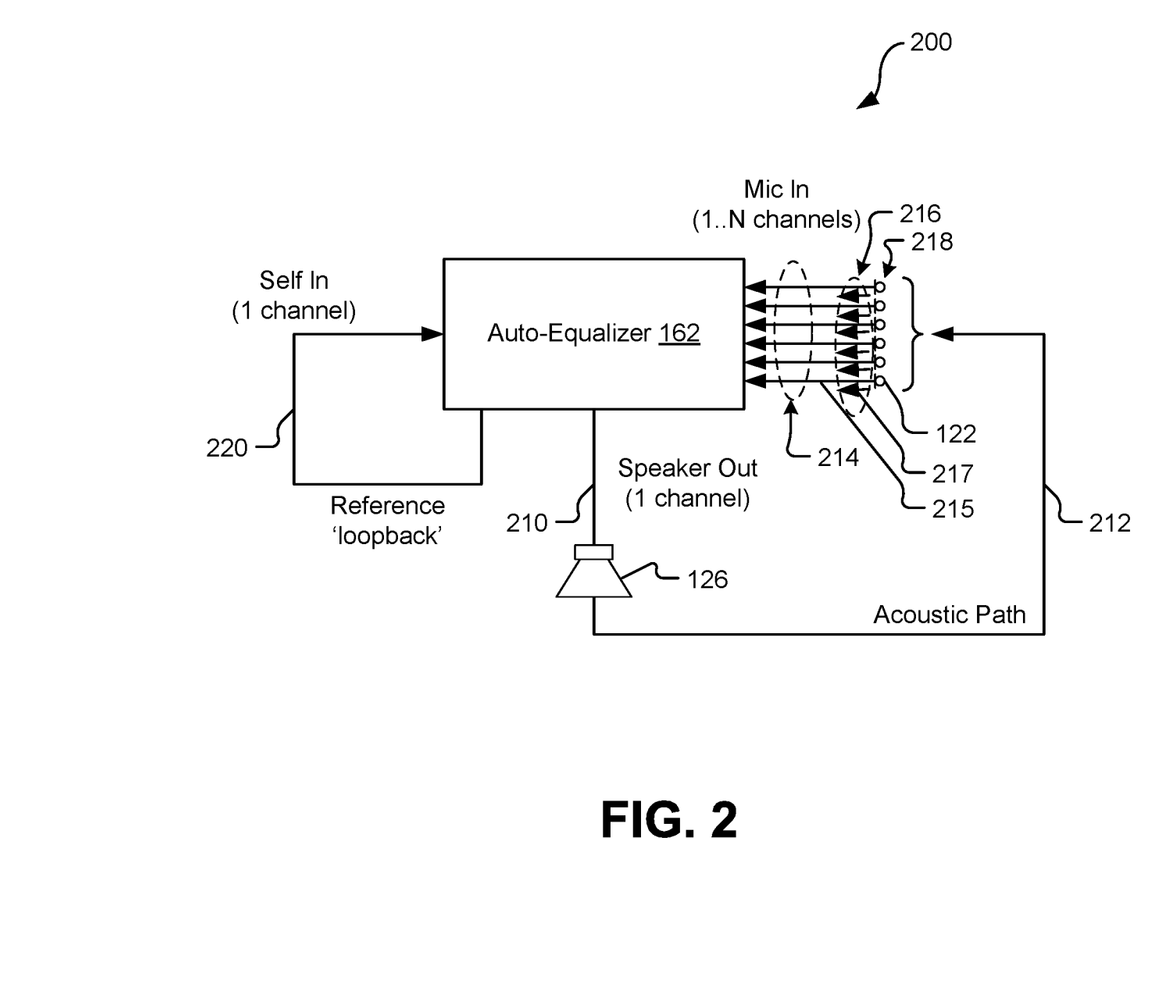
FIG. 2 is a diagram of a particular implementation of components that may be incorporated in the device included in the system of FIG. 1.

FIG. 2 depicts an example 200 of components that may be implemented in the device 102 of FIG. 1. The auto-equalizer 162 is configured to receive multiple audio input signals 216 from multiple microphones 218 via multiple respective channels 214, such as a first audio input signal 217 that it is received from the first microphone 122 via a first audio channel 215. Although six microphones 218, audio input signal 216, and channels 214 are illustrated, other implementations may include other numbers of microphones, audio input signals, and channels. Each of the multiple audio channels 214 corresponds to a respective one of the multiple microphones 218, and each of the multiple audio input signals 216 is indicative of sound propagation from the speaker 126 to the corresponding microphone of the multiple microphones 218. The auto-equalizer 162 is also responsive to a reference "loopback" signal 220. The auto-equalizer 162 is configured to generate an audio output signal 210 that is provided to the speaker 126. Output sound that is played out by the speaker 126 and that corresponds to the audio output signal 210 is accessible as an input sound at the microphones 218 via an acoustic path 212. For example, the acoustic path 212 can include the first acoustic path 142 and the second acoustic path 144 of FIG. 1.

An a priori unknown music or movie audio signal, such as from a stored audio file or streaming content, may be played out at the speaker 126, and can also be simultaneously (e.g., overlapping in time) recorded as playout is ongoing, both internally and via the microphones 218. The internally recorded audio is represented as the reference loopback signal 220 signal, and the audio recorded via the microphones 218 is represented as the multiple audio input signals 216.

The auto-equalizer 162 is configured to process each of the multiple audio input signals 216 and to generate impulse response data corresponding to each of the multiple audio channels 214. In some implementations, the auto-equalizer 162 is configured to generate the impulse response data based on a supervised system identification process, such as by comparing the reference loopback signal 220 to each of the received audio input signals 216 to determine an RIR for each of the channels 214. The RIRs can be processed to generate equalization data for each of the channels 214, and the equalization data can be used to generate a playout equalization filter, as described further with reference to FIGS. 3-7.

FIG. 3 depicts an example of a device 300 that includes a memory 302 coupled to a processor 304. The memory 302 is configured to store instructions 310. The processor 304 represents one or more processors (e.g., one or more processing cores), such as a central processing unit (CPU), a digital signal processor (DSP), one or more other processing cores, or a combination thereof. In a particular implementation, the device 300 corresponds to the auto-equalizer 162, or a portion of the auto-equalizer 162, of FIG. 1.

The processor 304 includes a room equalization generator 330 and a "smart" averaging unit 340. For example, the room equalization generator 330, the smart averaging unit 340, or a combination thereof, may be implemented via execution of one or more of the instructions 310 at the processor 304. Alternatively, at least a portion of the functionality associated with the room equalization generator 330, the smart averaging unit 340, or a combination thereof, may be performed via dedicated hardware, circuitry, or other physical components in place of, or in conjunction with, execution of the instructions 310.

The room equalization generator 330 is configured to receive impulse response data 320, such as a first impulse response 322 corresponding to the first audio channel 215 associated with the first microphone 122 and the first audio input signal 217 of FIG. 2. The room equalization generator 330 is configured to process the impulse response data 320 to generate equalization filter data 332. For example, the equalization filter data 332 can include, or be indicative of, multiple equalization filters (e.g. data indicating filter coefficients for multiple equalization filters). Each of the equalization filters may be associated with the corresponding audio channel of the multiple audio channels 214 and may be based on a desired response, such as described further with reference to FIGS. 4-5. The first impulse response 322 may be received from a supervised system identification operation that is implemented internal to the processor 304, external to the processor 304 but within the device 300, or in a component that is coupled to the device 300.

In a particular implementation, the room equalization generator 330 is configured to perform a weighted least squares operation based on the impulse response data 320 and to invert a result of the weighted least squares operation to generate a first equalization filter associated with the audio channel. The room equalization generator 330 is also configured to perform a regularization operation based on the first equalization filter to generate the equalization filter associated with the audio channel. An example of supervised system identification to generate the impulse response data 320 is described with reference to FIG. 4, and an example of generation of an equalization filter is described with reference to FIG. 5.

The smart averaging unit 340 is configured to receive the equalization filter data 332 and process the equalization filter data 332 to determine a playback equalization filter 342. The playback equalization filter 342 is configured to be applied to an audio playback signal prior to playout at one or more speakers, such as at the speakers 126-128 of FIG. 1. For example, the smart averaging unit 340 may be configured to determine the playback equalization filter 342 by selecting a single equalization filter from the equalization filter data 332 or by generating an average or weighted average of two or more of the equalization filters that are represented in the equalization filter data 332. Additional examples of processing that may be performed by the smart averaging unit 340 to generate the playback equalization filter 342 are described with reference to FIG. 6.

Figure 4:
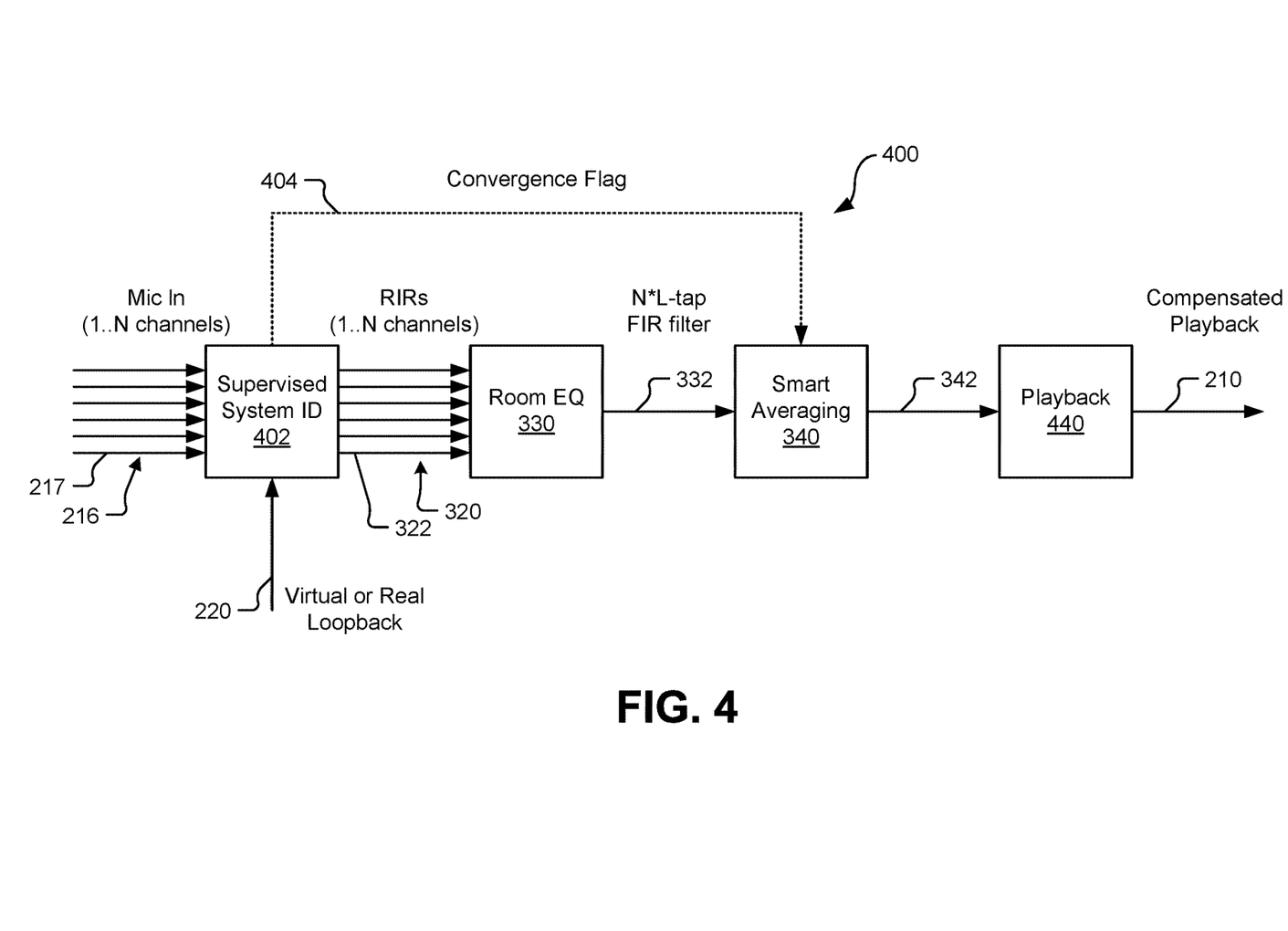
FIG. 4 is a diagram of another particular implementation of components that may be incorporated in the device included in the system of FIG. 1.

FIG. 4 depicts an example of an implementation 400 that may be included in the device 102 of FIG. 1, such as in the auto-equalizer 162, or in the device 300 of FIG. 3, as illustrative, non-limiting examples. A supervised system identification (ID) unit 402 is coupled to the room equalization generator 330 of FIG. 3. The room equalization generator 330 provides the equalization filter data 332 to the smart averaging unit 340 as described previously with reference to FIG. 3. The equalization filter data 332 is illustrated as N finite impulse response (FIR) filters each having L taps, where N is the number of microphones and L is a positive integer. The playback equalization filter 342 is provided to a playback unit 440.

The supervised system identification unit 402 is configured to receive the multiple audio input signals 216, including the first audio input signal 217, and to generate the impulse response data 320 based on the multiple audio input signals 216 and the loopback signal 220. In an illustrative example, the supervised system identification unit 402 is configured to receive, from each of the microphones 218 via a respective audio channel of the multiple audio channels 214, an associated audio input signal, such as the first audio input signal 217. The associated audio input signal is indicative of an input sound that is captured by the corresponding microphone 122 and that corresponds to an audio output signal 210 that is played out at the one or more speakers, such as the speaker 126 and internally recorded as the loopback signal 220. The supervised system identification unit 402 is configured to generate the room impulse response data 320 based on each of the audio input signals 216 and the audio output signal 210 (e.g., the loopback signal 220). The impulse response data 320 includes the room impulse response data for each audio channel of the multiple audio channels, such as the first impulse response 322 for the first audio channel 215.

In some implementations, the room impulse response data for each audio channel of the multiple audio channels is generated based on a supervised system identification operation that includes generating, for each of the audio input signals 216, an adaptive filter to detect room impulse responses based on comparison of the audio input signal to the loopback signal 220. Once the adaptive filters are determined to have converged, the adaptive filters are unlikely to lose convergence unless the acoustic environment changes, such as when the device 102 is moved to a different location or furniture within the room is changed.

In some implementations, the supervised system identification unit 402 is configured to generate a convergence flag 404 that indicates whether one or more of the adaptive filters are in a converged state or are in a non-converged state. The convergence flag 404 can be monitored by the smart averaging unit 340, and a detected transition from a converged state to a non-converged state (or vice versa) can trigger, at the smart averaging unit 340, an update operation to generate an updated playback equalization filter 342 based on the updated equalization filter data 332 received from the room equalization generator 330. As a result, a change in acoustic conditions can be detected and auto-calibration initiated based on the convergence flag 404, without requiring user intervention to initiate the re-calibration process.

The playback unit 440 is configured to apply the playback equalization filter 342 to an audio signal to be output to adjust for detected room characteristics prior to playout of the audio signal. For example, the playback unit 440 can include a mixer, as described further with reference to FIG. 6. The resulting audio output signal 210 corresponds to a compensated playback signal that can be provided to one or more speakers, such as the speaker 126.

Figure 5:
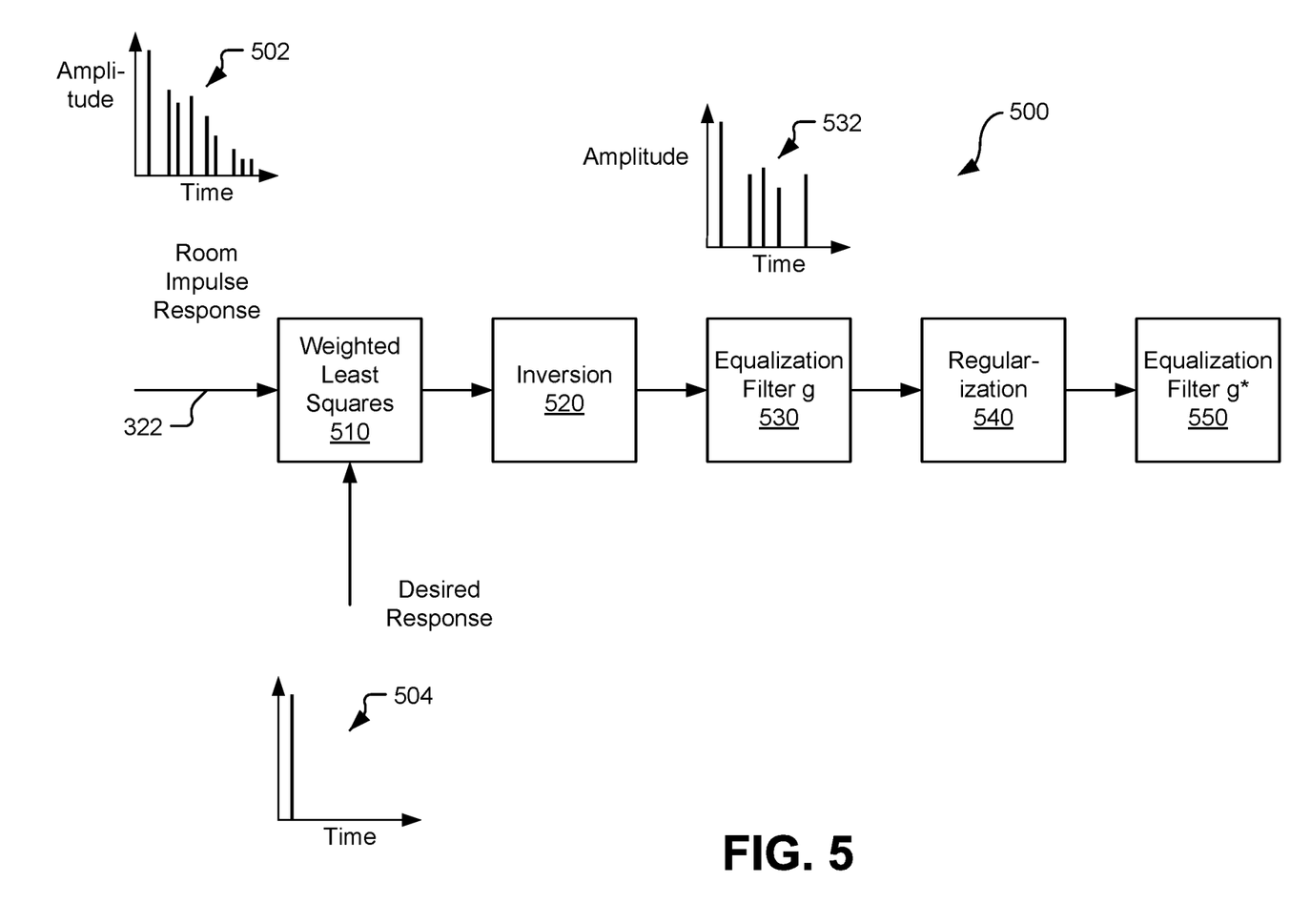
FIG. 5 is a diagram of another particular implementation of components that may be incorporated in the device included in the system of FIG. 1.

FIG. 5 depicts an implementation 500 of components that may be implemented in the room equalization generator 330 and including a weighted least squares component 510, an inversion component 520, and a regularization component 540.

The weighted least squares component 510 is configured to receive the impulse response data 320 and to perform a weighted least squares operation based on the impulse response data corresponding to each audio channel, such as the first impulse response 322 corresponding to the first audio channel 215. The first impulse response 322 is illustrated in a RIR graphical representation 502. The weighted least squares component 510 is configured to perform the weighted least squares operation further based on a desired response. The desired response is illustrated as a Dirac delta-type graphical representation 504 that has unit area and that is zero everywhere other than a single time interval. However, in other implementations, other desired response characteristics can be used. The weighted least squares component 510 outputs, for each of the audio channels, data indicative of a filter that minimizes or substantially reduces a least squares error between the impulse response for that channel and the desired response.

The inversion component 520 is configured to invert a result of the weighted least squares operation to generate a first equalization filter "g" 530 that is associated with the audio channel and that is illustrated in a graphical representation 532. The regularization component 540 is configured to perform a regularization operation based on the first equalization filter 530 to generate an equalization filter "g*" 550 associated with the audio channel. The equalization filter 550 may be provided to the smart averaging unit 340 as part of the equalization filter data 332.

The regularization operation can include reducing one or more peaks in the first equalization filter 530. For example, if the output of the weighted least squares component 510 indicates a frequency response that has deep notches in high frequency ranges (the position and depth of high-frequency notches can be dependent on the position of the device in the room), after inversion such notches result in large peaks in the high frequency ranges in the equalization filter 530 (e.g., as compared to non-peak portions of the equalization filter 530), which can result in improper high frequency amplification. The regularization component 540 can apply a filter to reduce high-frequency peaks or can taper from the first equalization filter 530 at lower frequency ranges to the original response at higher frequencies for less aggressive filtering in higher frequency ranges, as illustrative, non-limiting examples.

Figure 6:
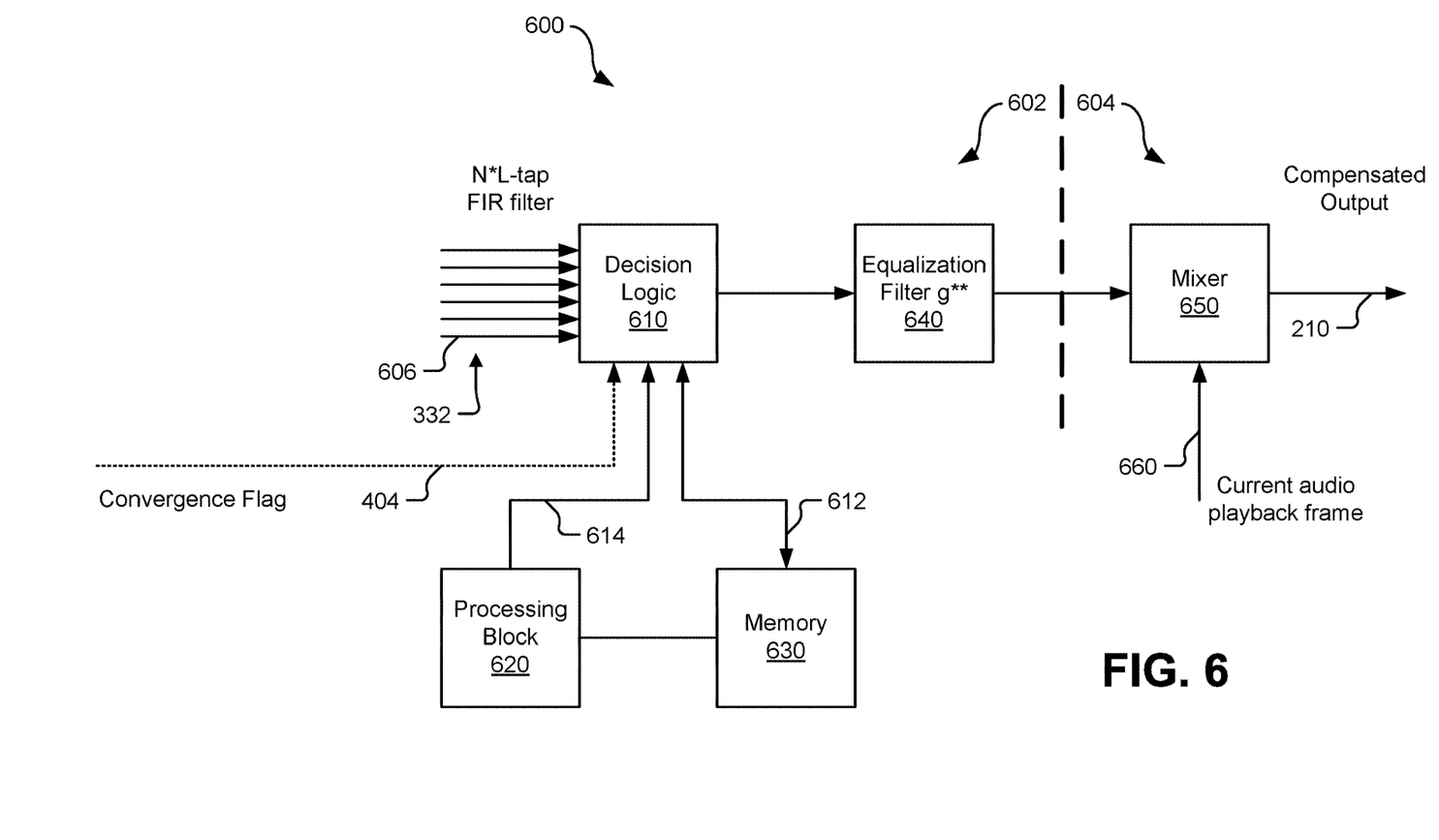
FIG. 6 is a diagram of another particular implementation of components that may be incorporated in the device included in the system of FIG. 1.

FIG. 6 depicts an example of components 600 that can be implemented in the device 102, such as in the auto-equalizer 162 of FIGS. 1-2, in components illustrated in FIGS. 3-4, or a combination thereof. A first portion 602 includes decision logic 610, a processing block 620, and a memory 630. A second portion 604 includes a mixer 650. In a particular example, the first portion 602 is implemented in the smart averaging unit 340, and the second portion 604 is implemented in the playback unit 440.

The decision logic 610 is configured to receive the equalization filter data 332. The equalization filter data 332 may include data corresponding to multiple equalization filters. For example, the equalization filter data 332 may include one equalization filter for each audio channel processed by the room equalization generator 330, such as a first equalization filter 606 corresponding to the first audio channel 215 of FIG. 2. The decision logic 610 is responsive to an output 614 from the processing block 620 to determine a playback equalization filter "g**" 640. In an illustrative example, the playback equalization filter 640 corresponds to the playback equalization filter 342 of FIGS. 3-4. The decision logic 610 may also be responsive to the convergence flag 404 to initiate re-calibration due to detecting loss of convergence and re-convergence of one or more adaptive filters in the supervised system identification unit 402 of FIG. 4.

The decision logic 610 can be configured to determine the playback equalization filter 640 via selection of one of the equalization filters associated with an audio channel in the equalization filter data 332, such as the first equalization filter 606, to use as the playback equalization filter 640. To illustrate, the processing block 620 may determine a "best" of the equalization filters (e.g., the filter that is most representative of the other equalization filters, or the filter that corresponds to the strongest audio channel or the least distorted audio channel, as non-limiting examples) and indicate the selected equalization filter to the decision logic 610 via the output 614.

As another example, the decision logic 610 can be configured to determine the playback equalization filter 640 via application of an averaging operation to the equalization filters in the equalization filter data 332 to generate the playback equalization filter 640. In some implementations, a beam-forming informed selection of a "best" source-to-microphone acoustic path is determined in conjunction with the processing block 620 and the memory 630. In some implementations, audio and room impulse responses are evaluated as statistical features, such as using a machine-learning based regression or room modeling, as illustrative, non-limiting examples.

The memory 630 can store the equalization filter data 332 and other information as multi-dimensional data 612 representative of temporal and spatial aspects. To illustrate, because the adaptive filters from the supervised system identification unit 402 can converge quickly (on the order of seconds) and the convergence flag 404 can signal a convergence event, converged room impulse responses are used for analysis and storage to the memory 630. Environmental (acoustic) changes are detected when the room impulse responses are signaled as not converged (e.g., room impulse responses are tracked over time), and equalization filters can be updated when environmental changes are detected. Different acoustic path room impulse responses can be used for analysis, for example, one for each source-to-microphone path.

Figure 7:
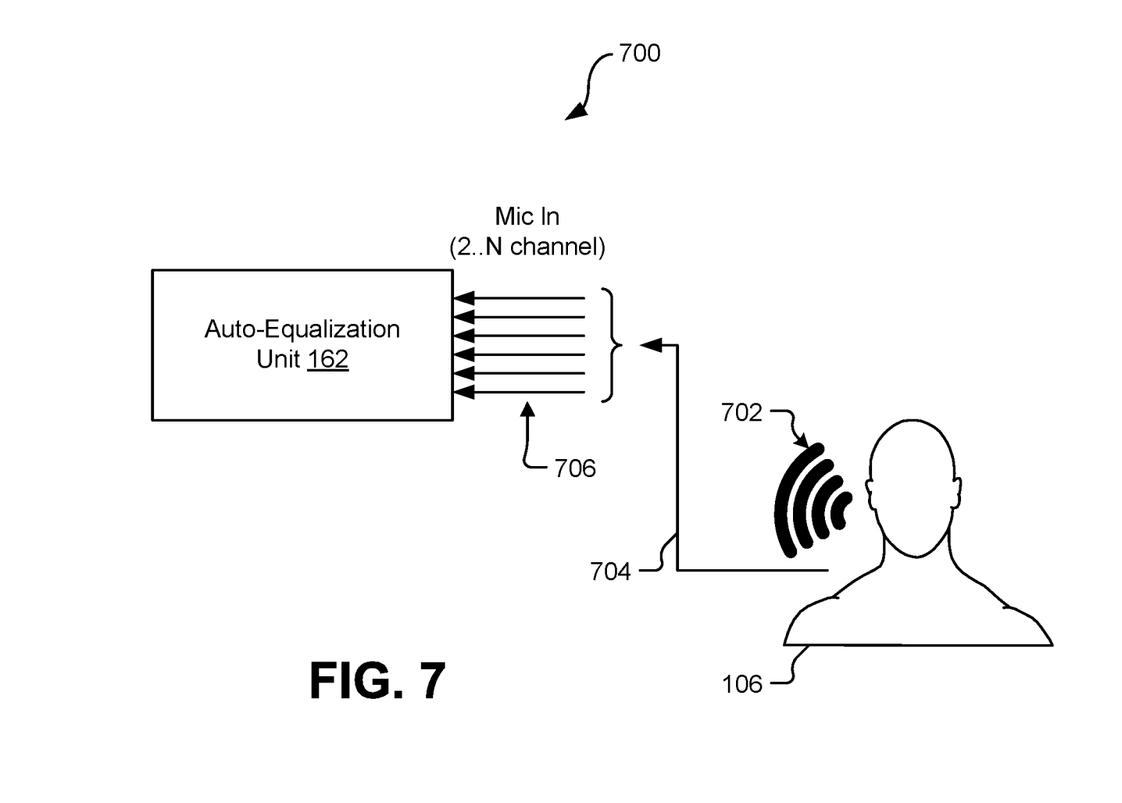
FIG. 7 is a diagram of a particular implementation of channel estimation that may be implemented by the device included in the system of FIG. 1.

In some implementations, time- and spatial-varying user-to-device path information can be added, such as described further with reference to FIG. 7.

The mixer 650 is configured to apply the playback equalization filter 640 to an audio playback signal 660 (e.g., a current audio playback frame) to generate a filtered playback signal, such as the audio output signal 210. One or more speakers, such as the one or more speakers 128-128 of FIG. 1, can be coupled to the mixer 650 and configured to generate output sound responsive to the filtered playback signal.

FIG. 7 depicts an example of an implementation 700 that is configured to perform unsupervised system identification in conjunction with determining an acoustic channel corresponding to an acoustic path 704 between the user 106 and the microphones of the device 102. The implementation 700 can include a "blind" adaptive filter, and the acoustic channel between user 106 and the device 102 can be estimated blindly when the device has two or more microphones to capture multiple audio signals 706 capturing user speech 702, such as from voice commands.

Based on the speech signal from voice commands, a blind least mean squared (LMS)-based adaptive filter, or another type of filter, can estimate the additional room impulse response for the device-to-user (or equivalently, user-to-device) acoustic path 704. An equalization filter derived from this room impulse response can compensate output sound of the speaker at the user's position, such as by generating a "sweet spot" at the user's location. The equalization filter can be included in, or combined with, the equalization filter data 332 and used in determining the playback equalization filter 342.

Thus, the implementation 700 enables estimation of an impulse response and equalization filter corresponding to an acoustic channel between the device and the user 106 based on a speech signal from voice commands (e.g., the user speech 702) received from the user 106 at the multiple microphones. Because the impulse response is estimated blind and based on normal user speech (e.g., during normal interaction with an assistant application of a smart speaker device), the user 106 does not need to undergo a dedicated training or calibration process during which the user is required to repeat predetermined phrases. As a result, room equalization based on the user's position can be achieved without hampering the user's experience.

Figure 8:
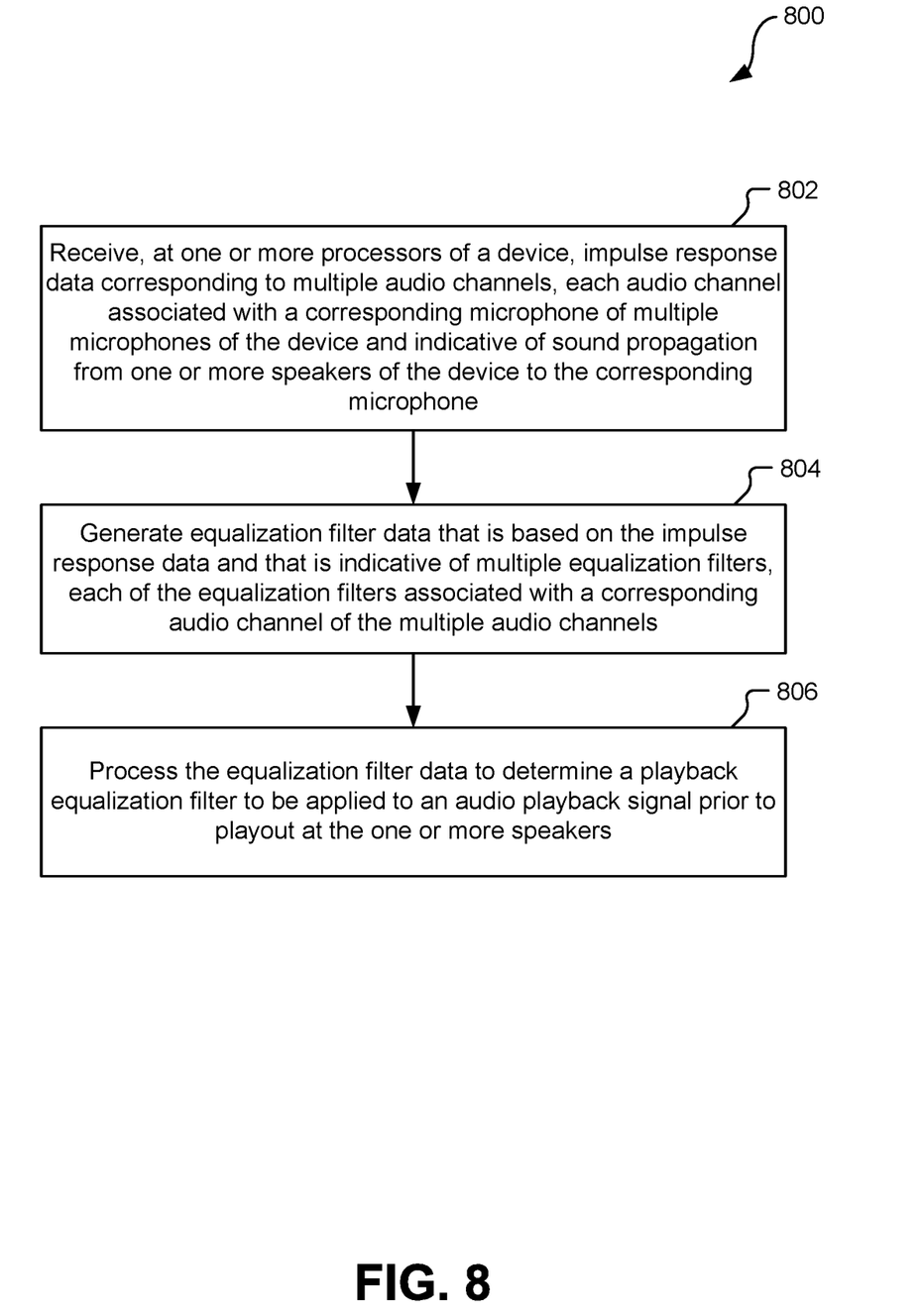
FIG. 8 is diagram of a particular implementation of a method of signal equalization that may be performed by the device included in the system of FIG. 1.

Referring to FIG. 8, a particular implementation of a method 800 of audio signal equalization is depicted that may be performed by the device 102 of FIG. 1, the device 300 of FIG. 3, one or more components depicted in FIGS. 2-7, or any combination thereof.

The method 800 includes receiving, at one or more processors of a device, impulse response data corresponding to multiple audio channels, at 802. Each audio channel is associated with a corresponding microphone of multiple microphones of the device and indicative of sound propagation from one or more speakers of the device to the corresponding microphone. As an example, in the device 300 of FIG. 3, the impulse response data 320 is received at the room equalization generator 330 and corresponds to the multiple audio channels 214 of FIG. 2.

The method 800 includes generating equalization filter data that is based on the impulse response data and that is indicative of multiple equalization filters, at 804. Each of the equalization filters is associated with a corresponding audio channel of the multiple audio channels. In an example, the equalization filter data is generated by the room equalization generator 330 and corresponds to the equalization filter data 332.

The method 800 includes processing the equalization filter data to determine a playback equalization filter to be applied to an audio playback signal prior to playout at the one or more speakers, at 806. In an example, the smart averaging unit 340 processes the equalization filter data 332 to determine the playback equalization filter 342.

In some implementations, the method 800 also includes receiving, from each of the microphones, an associated audio input signal (e.g., the first audio input signal 217) via a respective audio channel (e.g., the first audio channel 215) of the multiple audio channels. The associated audio input signal is indicative of an input sound that is captured by the corresponding microphone and that corresponds to an audio output signal that is played out at the one or more speakers. The method 800 may also include generating, based on each of the audio input signals and the audio output signal, room impulse response data for each audio channel of the multiple audio channels. The impulse response data includes the room impulse response data for each audio channel of the multiple audio channels. In an example, the room impulse response data for each audio channel of the multiple audio channels is generated based on a supervised system identification operation, such as by the supervised system identification unit 402.

In some implementations, generating the equalization filter data includes, for each audio channel of the multiple audio channels, performing a weighted least squares operation based on the impulse response data corresponding to the audio channel and further based on a desired response (e.g., at the weighted least squares component 510), inverting a result of the weighted least squares operation to generate a first equalization filter associated with the audio channel (e.g., at the inversion component 520), and performing a regularization operation based on the first equalization filter to generate the equalization filter associated with the audio channel (e.g., at the regularization component 540). In an example, the regularization operation includes reducing one or more peaks in the first equalization filter.

In a particular implementation, the playback equalization filter is determined based on at least one of: selecting one of the equalization filters associated with an audio channel to use as the playback equalization filter; applying an averaging operation to the equalization filters to generate the playback equalization filter; or estimating an impulse response and equalization filter corresponding to an acoustic channel between the device and a user based on a speech signal from voice commands received from the user at the multiple microphones. In an example, the playback equalization filter is determined as described with reference to the decision logic 610, the processing block 620, and the memory 630 of FIG. 6.

In some implementations, the method 800 includes applying the playback equalization filter to the audio playback signal to generate a filtered playback signal and generating output sound responsive to the filtered playback signal at the one or more speakers, such as described with reference to the playback unit 440 of FIG. 4, the mixer 650 of FIG. 6, or a combination thereof.

By generating the equalization filter data based on the impulse response data and processing the equalization filter data to determine the playback equalization filter, the method 800 enables a device to calibrate the device's audio playback based on output sound that is received at the device's microphones and to least partially compensate for distortion due to room geometry, materials, and furniture and also distortion due to non-ideal performance of components in the device without requiring the manual calibration or user input that is used for calibration of conventional systems. Music or movie audio content can be used for calibration during normal use without playing out test tones or noise signals, resulting in an improved user experience. In addition, calibration can be performed periodically over time and while the device is in use, or when a change in the room is detected (e.g., when a change or convergence in the room impulse response(s) is detected), so that calibration can be maintained in a changing environment and without requiring user intervention.

The method 800 of FIG. 8 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 800 of FIG. 8 may be performed by a processor that executes instructions, such as described with reference to the processor 304 or the processing block 620.

Figure 9:
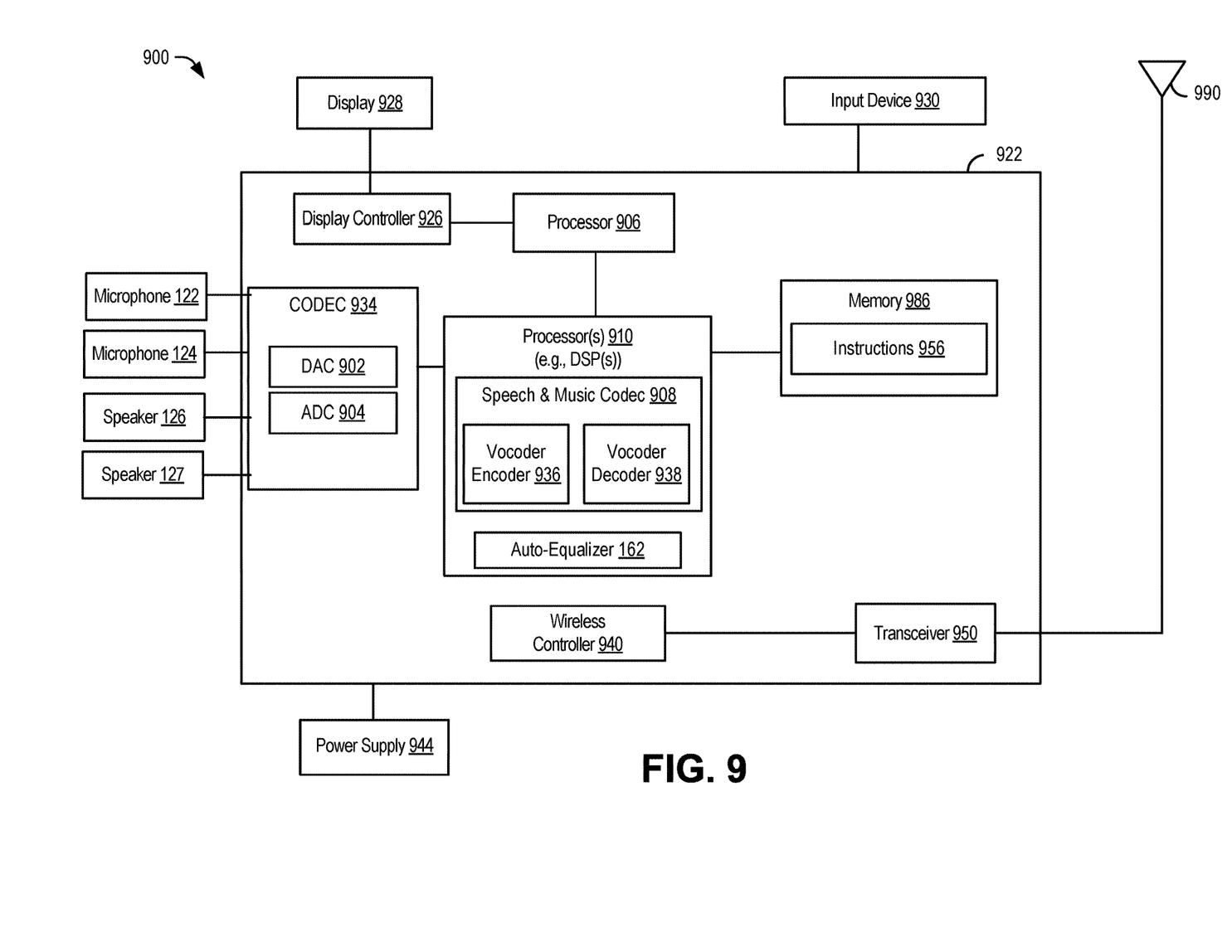
FIG. 9 is a block diagram of a particular illustrative example of a device that is operable to perform signal equalization.

Referring to FIG. 9, a block diagram of a particular illustrative implementation of a device is depicted and generally designated 900. In various implementations, the device 900 may have more or fewer components than illustrated in FIG. 9. In an illustrative implementation, the device 900 may correspond to the device 102. In an illustrative implementation, the device 900 may perform one or more operations described with reference to FIGS. 1-8.

In a particular implementation, the device 900 includes a processor 906 (e.g., a central processing unit (CPU)). The device 900 may include one or more additional processors 910 (e.g., one or more DSPs). The processors 910 may include a speech and music coder-decoder (CODEC) 908 and the auto-equalizer 162. The speech and music codec 908 may include a voice coder ("vocoder") encoder 936, a vocoder decoder 938, or both.

The device 900 may include a memory 986 and a CODEC 934. The memory 986 may include instructions 956, such as the instructions 310 of FIG. 3, that are executable by the one or more additional processors 910 (or the processor 906) to implement the functionality described with reference to the auto-equalizer 162. The device 900 may include a wireless controller 940 coupled, via a transceiver 950, to an antenna 990.

The device 900 may include a display 928 coupled to a display controller 926. The speaker 126, the second speaker 127, the first microphone 122, and the second microphone 124 may be coupled to the CODEC 934. The CODEC 934 may include a digital-to-analog converter 902 and an analog-to-digital converter 904. In a particular implementation, the CODEC 934 may receive analog signals from the microphones 122-124, convert the analog signals to digital signals using the analog-to-digital converter 904, and provide the digital signals to the speech and music codec 908. The speech and music codec 908 may process the digital signals. In a particular implementation, the speech and music codec 908 may provide digital signals to the CODEC 934. The CODEC 934 may convert the digital signals to analog signals using the digital-to-analog converter 902 and may provide the analog signals to the speakers 126-127.

In a particular implementation, the device 900 may be included in a system-in-package or system-on-chip device 922 that corresponds to the electronic component 160, the device 300, the implementation 400, the implementation 500, the components 600, or any combination thereof. In a particular implementation, the memory 986, the processor 906, the processors 910, the display controller 926, the CODEC 934, and the wireless controller 940 are included in a system-in-package or system-on-chip device 922. In a particular implementation, an input device 930 and a power supply 944 are coupled to the system-on-chip device 922. Moreover, in a particular implementation, as illustrated in FIG. 9, the display 928, the input device 930, the speakers 126-127, the microphones 122-124, the antenna 990, and the power supply 944 are external to the system-on-chip device 922. In a particular implementation, each of the display 928, the input device 30, the speakers 126-127, the microphones 122-124, the antenna 990, and the power supply 944 may be coupled to a component of the system-on-chip device 922, such as an interface or a controller.

The device 900 may include a smart speaker (e.g., the processor 906 may execute the instructions 956 to run a voice-controlled digital assistant application), a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a head-mounted display (e.g., for virtual reality or augmented reality applications) or any combination thereof.

In conjunction with the described implementations, an apparatus includes means for receiving impulse response data corresponding to multiple audio channels and for generating equalization filter data that is based on the impulse response data and that is indicative of multiple equalization filters. Each audio channel is associated with a corresponding microphone of multiple microphones of a device and indicative of sound propagation from one or more speakers of the device to the corresponding microphone, and each of the equalization filters is associated with a corresponding audio channel of the multiple audio channels. For example, the means for receiving impulse response data and for generating filter data can correspond to the room equalization generator 330, the weighted least squares component 510, the inversion component 520, the regularization component 540, one or more other circuits or components configured to receive impulse response data and generate filter data, or any combination thereof.

The apparatus also includes means for processing the equalization filter data to determine a playback equalization filter to be applied to an audio playback signal prior to playout at the one or more speakers. For example, the means for processing the equalization filter data can correspond to the smart averaging unit 340, the decision logic 610, the processing block 620, the memory 630, one or more other circuits or components configured to determine a playback equalization filter to be applied to an audio playback signal, or any combination thereof.

In some implementations, the apparatus also includes means for generating, based on each of multiple audio input signals indicative of an input sound that is captured by the corresponding microphone and that corresponds to an audio output signal that is played out at the one or more speakers, room impulse response data for each audio channel of the multiple audio channels. For example, the means for generating room impulse response data can correspond to the supervised system identification unit 402, one or more other circuits or components configured to generate room impulse response data, or any combination thereof.

In some implementations, the apparatus also includes means for applying the playback equalization filter to the audio playback signal to generate a filtered playback signal. For example, the means for applying the playback equalization filter to the audio playback signal to generate a filtered playback signal can correspond to the playback unit 440, the mixer 650, one or more other circuits or components configured to apply the playback equalization filter to the audio playback signal to generate a filtered playback signal, or any combination thereof.

In some implementations, a non-transitory computer-readable medium includes instructions that, when executed by one or more processors, cause the one or more processors to perform operations for audio signal equalization. The operations include receiving, at the one or more processors, impulse response data corresponding to multiple audio channels. Each audio channel is associated with a corresponding microphone of multiple microphones of the device and indicative of sound propagation from one or more speakers of the device to the corresponding microphone. The operations also include generating equalization filter data that is based on the impulse response data and that is indicative of multiple equalization filters. Each of the equalization filters is associated with a corresponding audio channel of the multiple audio channels. The operations also include processing the equalization filter data to determine a playback equalization filter to be applied to an audio playback signal prior to playout at the one or more speakers.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A device to perform audio signal equalization, the device comprising:
   a memory configured to store instructions; and
   one or more processors configured to execute the instructions to:
      receive impulse response data corresponding to multiple audio channels, each audio channel associated with a corresponding microphone of multiple microphones of an audio device and indicative of sound propagation from one or more speakers of the audio device to the corresponding microphone;
      generate equalization filter data that is based on the impulse response data and that is indicative of multiple equalization filters, each of the equalization filters associated with a corresponding audio channel of the multiple audio channels; and
      process the equalization filter data to determine, at least partially based on estimation of an impulse response and equalization filter corresponding to an acoustic channel between the device and a user based on a speech signal from voice commands received from the user at the multiple microphones, a playback equalization filter to be applied to an audio playback signal prior to playout at the one or more speakers.

2. The device of claim 1, wherein the one or more processors are implemented in the audio device, and wherein the audio device includes one of:
   a speaker bar; or a wireless speaker and voice command device with an integrated assistant application.

3. The device of claim 1, wherein the one or more processors are further configured to:
receive, from each of the microphones via a respective audio channel of the multiple audio channels, an associated audio input signal, the associated audio input signal indicative of an input sound that is captured by the corresponding microphone and that corresponds to an audio output signal that is played out at the one or more speakers; and
generate, based on each of the audio input signals and the audio output signal, room impulse response data for each audio channel of the multiple audio channels,
wherein the impulse response data includes the room impulse response data for each audio channel of the multiple audio channels.

4. The device of claim 3, wherein the room impulse response data for each audio channel of the multiple audio channels is generated based on a supervised system identification operation.

5. The device of claim 3, further comprising the multiple microphones configured to provide the audio input signals to the one or more processors.

6. The device of claim 1, wherein the one or more processors are further configured to, for each of the audio channels:
perform a weighted least squares operation based on the impulse response data corresponding to the audio channel and further based on a desired response;
invert a result of the weighted least squares operation to generate a first equalization filter associated with the audio channel; and
perform a regularization operation based on the first equalization filter to generate the equalization filter associated with the audio channel.

7. The device of claim 6, wherein the regularization operation includes reducing one or more peaks in the first equalization filter.

8. The device of claim 1, wherein the one or more processors are configured to determine the playback equalization filter further based on at least one of:
selection of one of the equalization filters associated with an audio channel to use as the playback equalization filter; or
application of an averaging operation to the equalization filters to generate the playback equalization filter.

9. The device of claim 1, further comprising:
a mixer configured to apply the playback equalization filter to the audio playback signal to generate a filtered playback signal; and
the one or more speakers coupled to the mixer and configured to generate output sound responsive to the filtered playback signal.

10. A method of audio signal equalization, the method comprising:
generating, at one or more processors of a device, impulse response data including room impulse response data based on a supervised system identification operation for each audio channel of multiple audio channels, each audio channel associated with a corresponding microphone of multiple microphones of the device and indicative of sound propagation from one or more speakers of the device to the corresponding microphone;
generating equalization filter data that is based on the impulse response data and that is indicative of multiple equalization filters, each of the equalization filters associated with a corresponding audio channel of the multiple audio channels; and
processing the equalization filter data to determine a playback equalization filter to be applied to an audio playback signal prior to playout at the one or more speakers.

11. The method of claim 10, further comprising receiving, from each of the microphones, an associated audio input signal via a respective audio channel of the multiple audio channels, the associated audio input signal indicative of an input sound that is captured by the corresponding microphone and that corresponds to an audio output signal that is played out at the one or more speakers.

12. The method of claim 11, wherein the room impulse response data is generated based on each of the audio input signals and the audio output signal.

13. The method of claim 10, wherein generating the equalization filter data includes, for each audio channel of the multiple audio channels:
performing a weighted least squares operation based on the impulse response data corresponding to the audio channel and further based on a desired response;
inverting a result of the weighted least squares operation to generate a first equalization filter associated with the audio channel; and
performing a regularization operation based on the first equalization filter to generate the equalization filter associated with the audio channel.

14. The method of claim 13, wherein the regularization operation includes reducing one or more peaks in the first equalization filter.

15. The method of claim 10, the playback equalization filter is determined based on at least one of:
selecting one of the equalization filters associated with an audio channel to use as the playback equalization filter;
applying an averaging operation to the equalization filters to generate the playback equalization filter; or
estimating an impulse response and equalization filter corresponding to an acoustic channel between the device and a user based on a speech signal from voice commands received from the user at the multiple microphones.

16. The method of claim 10, further comprising:
applying the playback equalization filter to the audio playback signal to generate a filtered playback signal; and
generating output sound responsive to the filtered playback signal at the one or more speakers.

17. A non-transitory computer-readable medium comprising instructions that, when executed by one or more processors of a device, cause the one or more processors to perform operations for audio signal equalization, the operations comprising:
receiving, at the one or more processors, impulse response data corresponding to multiple audio channels, each audio channel associated with a corresponding microphone of multiple microphones of the device and indicative of sound propagation from one or more speakers of the device to the corresponding microphone;
generating equalization filter data that is based on the impulse response data and that is indicative of multiple equalization filters, each of the equalization filters associated with a corresponding audio channel of the multiple audio channels; and processing the equalization filter data to determine, at least partially based on estimation of an impulse response and equalization filter corresponding to an acoustic channel between the device and a user based on a speech signal from voice commands received from the user at the multiple microphones, a playback equalization filter to be applied to an audio playback signal prior to playout at the one or more speakers.

18. The non-transitory computer-readable medium of claim 17, the operations further comprising:
receiving, from each of the microphones via a respective audio channel of the multiple audio channels, an associated audio input signal, the associated audio input signal indicative of an input sound that is captured by the corresponding microphone and that corresponds to an audio output signal that is played out at the one or more speakers; and
generating, based on each of the audio input signals and the audio output signal, room impulse response data for each audio channel of the multiple audio channels,
wherein the impulse response data includes the room impulse response data for each audio channel of the multiple audio channels.

19. The non-transitory computer-readable medium of claim 18, wherein the room impulse response data for each audio channel of the multiple audio channels is generated based on a supervised system identification operation.

20. The non-transitory computer-readable medium of claim 17, wherein generating the equalization filter data includes, for each audio channel of the multiple audio channels:
performing a weighted least squares operation based on the impulse response data corresponding to the audio channel and further based on a desired response;
inverting a result of the weighted least squares operation to generate a first equalization filter associated with the audio channel; and
performing a regularization operation based on the first equalization filter to generate the equalization filter associated with the audio channel.

21. The non-transitory computer-readable medium of claim 20, wherein the regularization operation includes reducing one or more peaks in the first equalization filter.

22. The non-transitory computer-readable medium of claim 17, wherein the playback equalization filter is determined further based on at least one of:
selecting one of the equalization filters associated with an audio channel to use as the playback equalization filter; or
applying an averaging operation to the equalization filters to generate the playback equalization filter.

23. The non-transitory computer-readable medium of claim 17, further comprising:
applying the playback equalization filter to the audio playback signal to generate a filtered playback signal; and
generating output sound responsive to the filtered playback signal at the one or more speakers.

24. An apparatus to perform audio signal equalization, the apparatus comprising:
means for receiving impulse response data including room impulse response data, the room impulse response data based on a supervised system identification operation for each audio channel of multiple audio channels, and for generating equalization filter data that is based on the impulse response data and that is indicative of multiple equalization filters, each audio channel associated with a corresponding microphone of multiple microphones of a device and indicative of sound propagation from one or more speakers of the device to the corresponding microphone, and each of the equalization filters associated with a corresponding audio channel of the multiple audio channels; and
means for processing the equalization filter data to determine a playback equalization filter to be applied to an audio playback signal prior to playout at the one or more speakers.

25. The apparatus of claim 24, further comprising:
means for generating, based on each of multiple audio input signals indicative of an input sound that is captured by the corresponding microphone and that corresponds to an audio output signal that is played out at the one or more speakers, the room impulse response data for each audio channel of the multiple audio channels.

26. The apparatus of claim 25, wherein the means for processing the equalization filter data to determine a playback equalization filter is configured to determine the playback equalization filter based on estimation of an impulse response and equalization filter corresponding to an acoustic channel between the device and a user based on a speech signal from voice commands received from the user at the multiple microphones.

27. The apparatus of claim 24, further comprising means for applying the playback equalization filter to the audio playback signal to generate a filtered playback signal.

28. The apparatus of claim 24, wherein the means for processing the equalization filter data to determine a playback equalization filter is configured, for each of the audio channels, to:
perform a weighted least squares operation based on the impulse response data corresponding to the audio channel and further based on a desired response;
invert a result of the weighted least squares operation to generate a first equalization filter associated with the audio channel; and
perform a regularization operation based on the first equalization filter to generate the equalization filter associated with the audio channel.

29. The apparatus of claim 28, wherein the regularization operation includes reducing one or more peaks in the first equalization filter.

30. The apparatus of claim 24, wherein the means for processing the equalization filter data to determine a playback equalization filter is configured to determine the playback equalization filter based on at least one of:
selection of one of the equalization filters associated with an audio channel to use as the playback equalization filter; or
application of an averaging operation to the equalization filters to generate the playback equalization filter.

* * * * *